United States Patent [19]

Duda

[11] Patent Number: 4,842,404
[45] Date of Patent: Jun. 27, 1989

[54] DUAL DETECTOR LASER BEAM POWER MONITOR

[75] Inventor: C. Richard Duda, El Segundo, Calif.
[73] Assignee: ILC Technology, Inc., Sunnyvale, Calif.
[21] Appl. No.: 144,556
[22] Filed: Jan. 13, 1988
[51] Int. Cl.[4] .............................................. A01J 1/00
[52] U.S. Cl. ..................................... 356/218; 356/222; 356/236
[58] Field of Search ............... 356/121, 218, 222, 225, 356/236

[56] References Cited

U.S. PATENT DOCUMENTS

| | | | |
|---|---|---|---|
| 3,344,703 | 10/1967 | Milton | 88/23 |
| 3,850,525 | 11/1974 | Kaye | 356/73 |
| 3,994,586 | 11/1976 | Sharkins et al. | 356/73 |
| 4,030,831 | 6/1977 | Gowrinathan | 356/109 |
| 4,037,959 | 7/1977 | Bumgardner | 356/222 |
| 4,242,581 | 12/1980 | Crow | 250/227 |
| 4,260,255 | 4/1981 | Wachs et al. | 356/222 |
| 4,548,499 | 10/1985 | Eisert et al. | 356/318 |
| 4,583,860 | 4/1986 | Butner | 356/236 |
| 4,586,821 | 5/1986 | Chandra et al. | 356/363 |
| 4,681,450 | 7/1987 | Azzam | 356/367 |

Primary Examiner—Richard A. Rosenberger
Attorney, Agent, or Firm—Marvin H. Kleinberg; Matthew F. Jodziewicz

[57] ABSTRACT

An apparatus for monitoring the light energy power level of a beam of light, includes beamsplitters on the axis of the light beam for directing portions of the light beam in first and second paths respectively orthogonal to the axis while transmitting the remaining portion of the light beam therethrough. First and second photodetectors having similar spectral responsivity intercept the first and second light beam portions respectively, and detect and signal the light energy power level of the respective first and second light beam portions. Analysis circuitry coupled to the first and second photodetectors and responsive to the output signals therefrom to calculate the total light energy power level of the light beam. The apparatus resolves linearly polarized light into two orthogonal components while permitting most of the light to exit. This exit beam can be analyzed in terms of the incident beam or monitored for measurement or control purposes.

18 Claims, 2 Drawing Sheets

DUAL DETECTOR LASER BEAM POWER MONITOR

BACKGROUND OF THE INVENTION

1. Field of the Invention

This invention relates in general to light measuring, and, more particularly, to means for providing a continuous real-time indication of the radiated energy output of a laser by accurately sampling and measuring beam power of a laser without blocking or unduly perturbing the laser beam.

2. Description of the Related Art

Measurement of the power of the light beam emitted by commonly available laboratory lasers, especially of helium-neon lasers, is a routine task that is usually performed by laboratory personnel to what is believed to be a high level of accuracy.

This belief, as to the level of accuracy of the reported measurements, is quite often erroneous and sometimes incorrect up to thirty percent (30%) due to the measurement means currently available.

Approximately twelve years ago, as helium-neon lasers became more readily available for laboratory use, the National Bureau of Standards and the American Society for Testing and Materials conducted intercomparisons of the output power measurements being made by eleven laboratories on the output of helium-neon lasers. This comparison study revealed differences in the reported measurements of beam power of plus or minus 18 percent to be typical, and plus or minus 59 percent to be the extreme.

As more experience was gained both by measurement personnel and test instrument designers, the uncertainty margin for error in reported measurements began to decline.

Thermal detectors, which had long been used for measuring high power levels and uniform Infrared radiation from lamps, had to be re-designed to measure a concentrated, lower powered laser beam. Silicon photodiodes used in the thermal detectors however, had in some cases too much power output and a non-uniform response curve over the spectral distribution range of the laser beam's power envelope. Later testing and experimentation proved that the reason for many of the shortcomings of the silicon photodiodes was due to the fact that the very coherence of the laser beam radiation was causing an interference pattern to be set up in the flat glass protective windows encasing the silicon photodiodes, thus varying the beam's reflectance by upwards of seven percent.

There were also measurement problems caused by adding a metal film neutral density filter to attenuate the beam, or an interference filter to eliminate ambient light. Both of these elements require further measurement corrections to obtain a valid measurement of beam power, as they add more flat glass windows, polarization sensitivity and inter-reflection of the beam to the original system. Also, the additional complexity of the measurement path led to critical path alignment problems which, if uncorrected, would give erroneous results.

Many of these problems are lessened by adding translucent diffusers, that is, discs of flashed opal glass or white plastic, to the measurement apparatus. These translucent diffusers both attenuate the radiation reaching the detector element and destroy the coherence of the beam, so that reflectance non-uniformity of the beam at the point of measurement is no longer considered to be a problem.

Other forms of diffuser elements are also found in the prior art, whereby the radiation is diffusely reflected throughout an integrating sphere, that is, a sphere painted with a highly reflective, diffuse white paint. A small sampling port is provided in the sphere for the detector element and is positioned so as to align the detector element to avoid direct primary beam reflection.

Measurement uncertainty using these designs eventually became limited by the standard detector element used to calibrate the design.

In 1984, researchers at the National Bureau of Standards investigating the characteristics of silicon photodiodes, discovered that a particular type of silicon photodiode was internally 100 percent quantum efficient, that is, it had no losses in converting light to photocurrent over the entire visible wavelength region, other than that light lost due to surface reflection. By using four photodiodes aligned to inter-reflect an incident beam and summing the detector currents, a power level measurement within plus or minus 0.1 percent of the theoretical absolute value was attained.

Although it would appear that the problems of beam power measurement of laboratory lasers might disappear, they did not. The inherent characteristics of lasers themselves remain a problem in the areas of power instability and, in an even more subtle problem area, polarization of the beam.

A gas filled laser, such as the helium-neon type, is available in two distinct versions, both of which are highly polarized.

One of the two types is called "randomly polarized", or sometimes by the gross misnomer "unpolarized", and is characterized by being polarized in two orthogonal axes. Beam power alternates from one polarization plane to the other in a repetitive pattern that varies with time. Orientation of the polarization axes is set during manufacture of the laser device not by plan, but rather due to the random asymmetries in the resonant cavity optics. As the laser tube approaches thermal equilibrium with its environment, the rate of polarization exchange between the two axes tends to slow with respect to time, but the polarization orientation of the beam at any one moment is indeed random.

The second version of the gas filled laser inserts a Brewster window in the resonant cavity of the laser. This Brewster window is usually a flat glass window which, when tilted at a particular angle, is largely reflective to one axis of polarization and completely transparent to the other. Thus, power on only one axis is encouraged to resonate, and the result can be a completely linearly polarized beam. Variations in the radiated power, however, can be plus or minus 7 percent or more, depending on design, and while the variations may be rapid when the laser is first activated, they will tend to slow with respect to time but never disappear, as the resonant cavity approaches thermal equilibrium.

As a laser beam passes through optical elements, such as the Brewster window, reflectance will vary with orientation of the polarization axis of the beam and will even be affected by dielectric coatings, lens angles, centering alignment, and even residual optical strains. Each and every one of these elements will create further variances in power.

With the above background to the problem in mind, it is seen why modern measuring devices are inadequate and inaccurate in measuring beam power.

In general, when measuring beam power with a radiometer, the beam is temporarily blocked. When this blockage is removed, changes in beam power may occur and go undetected. The present invention provides a beam power monitor that solves both of these problems, that is, providing a constant indication of beam power without interrupting the beam.

While beamsplitters are not uncommon as beam power monitors, they have previously been designed to either avoid polarization by reflecting the beam from an optical wedge at a small angle so as to be polarization insensitive, or by relecting the beam at the Brewster angle with the requirement that polarization be invariant.

An optical chopper can be modified to monitor beam power by making one side of the blade a mirror to reflect the beam back to a detector whenever the beam is blocked, but this has limited applications.

While all these existing methods and devices attempt to avoid being polarization sensitive, when they succeed, they do lose valuable information regarding polarization effects within the laser system itself.

Accordingly, the present invention addresses these problems presently found in laser beam power measuring devices and provides not only a solution, but a means that is unobtrusive and accurate over a wide-range of power levels.

SUMMARY OF THE INVENTION

In general, an apparatus for monitoring the light energy power level of a beam of light, constructed in accordance with the invention, includes beam directing means located concentric to an axis of the light beam for directing first and second portions of the light beam in first and second paths which are orthogonal to the beam axis, while transmitting the remaining portion of the light beam therethrough. First and second photodetector means are positioned to intercept the first and second light beam portions respectively. Each photodetector has similar spectral responsivity for detecting the light energy power level of the respective first and second light beam portions directed thereto, and each has an output signal indicative of the detected light energy power level of the individual light beam portion. Analysis circuitry is coupled to the first and second photodetector means and is responsive to the output signals therefrom for calculating the total light energy power level of the light beam.

The novel features of construction and operation of the invention will be more clearly apparent during the course of the following description, reference being had to the accompanying drawings wherein has been illustrated a preferred form of the device of the invention and wherein like characters of reference designate like parts throughout the drawings.

DESCRIPTION OF THE PREFERRED EMBODIMENTS

Figure 1:
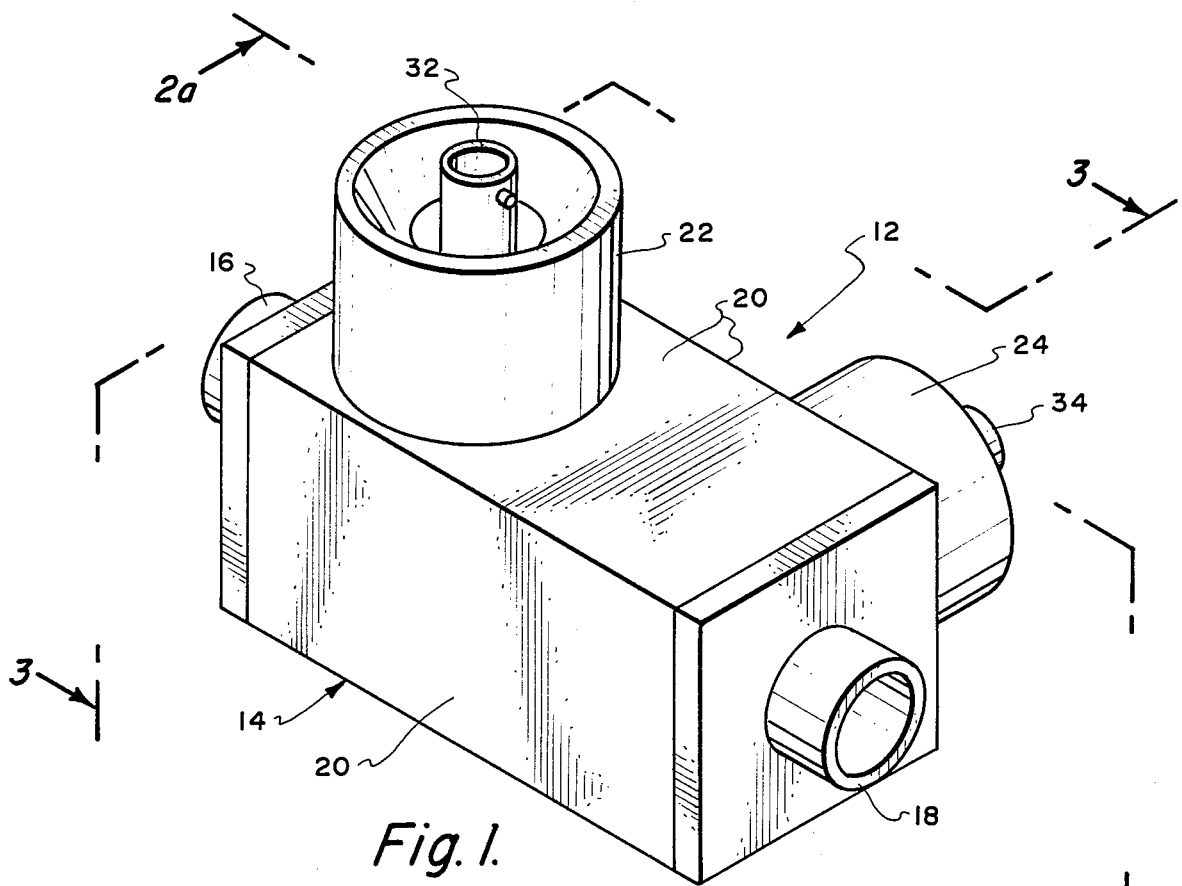
FIG. 1 is a side perspective view of a laser beam power monitor embodying the present invention.

Referring to the figures of drawings wherein like numbers of reference designate like elements throughout, it will be noted that in a preferred embodiment of the invention for use as a laser beam power monitor, the body of the device, generally referred to as 12, comprises an enclosure 14 having a beam entry port 16 and a beam exit port 18, both ports 16 and 18 being in alignment, so that the laser beam 17 being monitored can pass therethrough.

Intermediate the ends of enclosure 14 and formed in the side and top panels 20 of enclosure 14 are beam sampling ports 22, 24, orthogonally oriented with respect to one another and with respect to entry and exit ports 16 and 18, respectively.

Two identical optical wedge beamsplitters 26, 28 are located concentric to an axis 30 of the laser beam 17 being monitored, and are tilted orthogonally with respect to each other to reflect a portion of the laser beam 17 into beam sampling ports 22, 24.

Located in alignment with the beam portions being reflected into beam sampling ports 22 and 24, are photodetector means 32, 34.

In one preferred embodiment of the invention, silicon photodiodes are employed as photodetector means 32, 34, and are located in direct alignment with the beam portions being reflected into beam sampling ports 22, 24, so that the beam portions impinge directly onto the silicon photodiodes 32, 34.

Figure 2A:
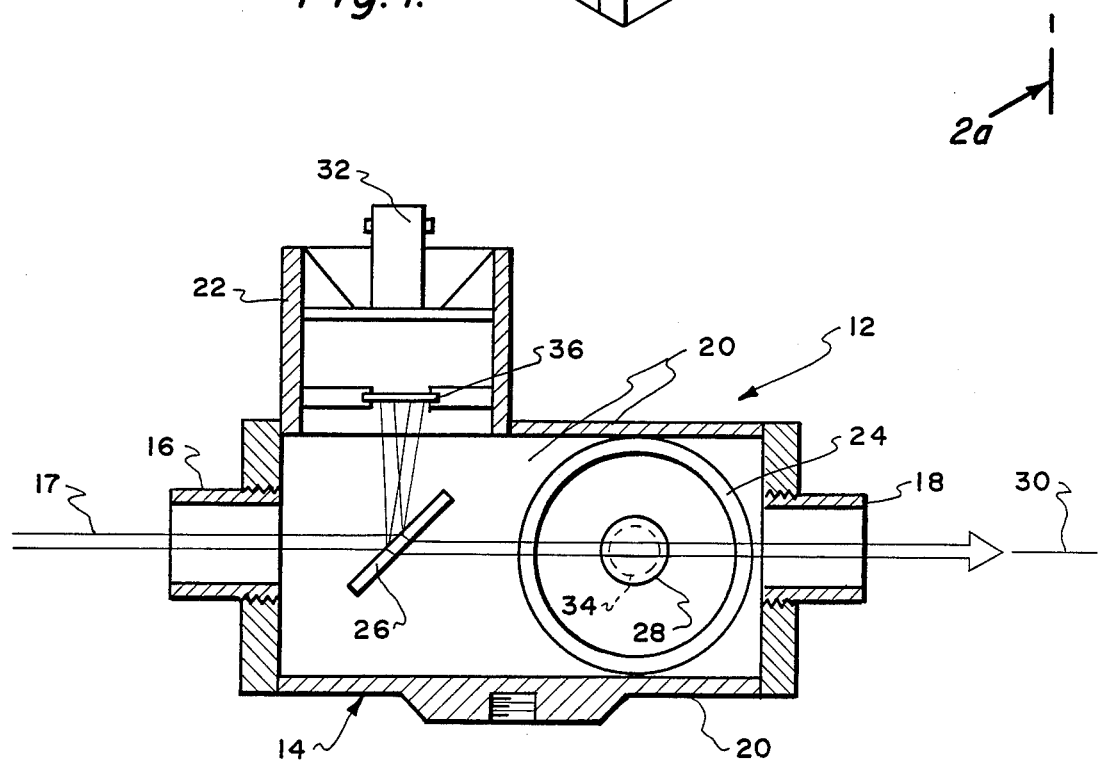
FIGS. 2a and 2b are each a view taken along the line 2a—2a of FIG. 1 in the direction of the appended arrows.
Figure 2B:
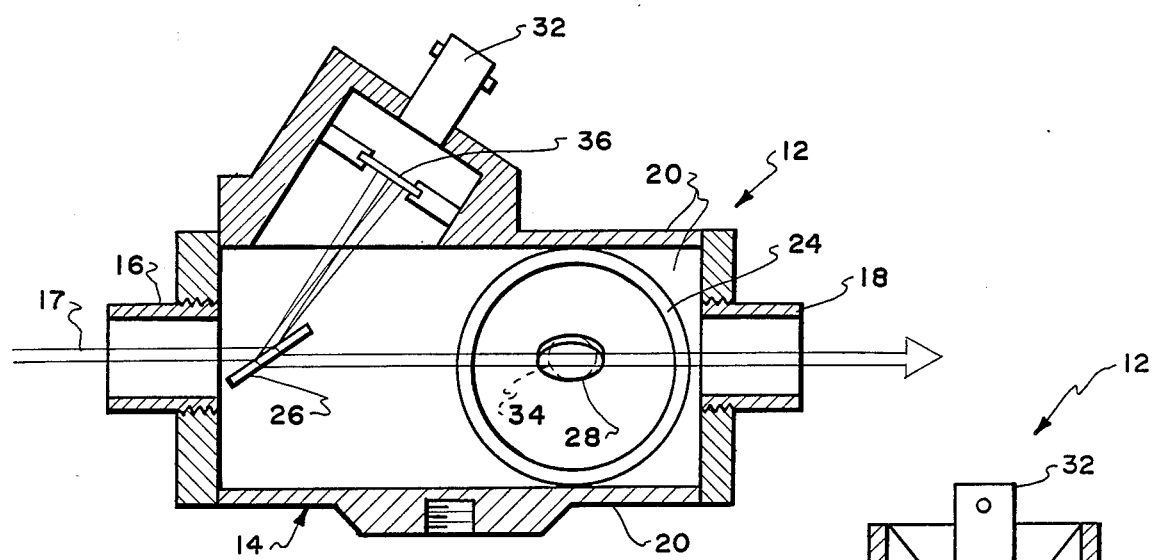
Figure 3:
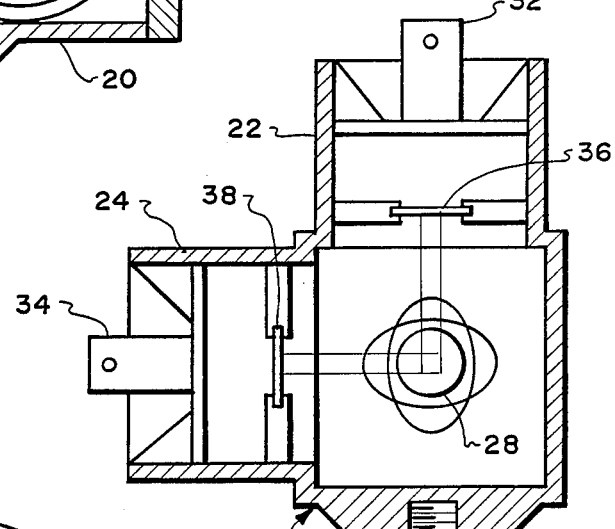
FIG. 3 is a view taken along the line 3—3 of FIG. 1 in the direction of the appended arrows.

If the tilt angles of the beamsplitters 26, 28 are at the Brewster angle (approximately 56 degrees), (See FIG. 2b) photodetector current from the silicon photodiodes 32, 34 would be responsive only to radiation in a single polarization axis.

By connecting the photodiodes 32, 34 electrically in parallel to sum the combined current signal, total beam power can be monitored. The current signal from the photodiodes 32, 34 can also be monitored individually to determine the contribution from the separate polarization components.

Throughput transmission of the beam in this configuration of the monitor is approximately seventy percent.

An alternate embodiment of a monitor embodying the present invention is designed with the tilt angle of the beamsplitters 26, 28 at about 45 degrees. This tilt angle may be chosen for either ease of manufacture or to increase the throughput transmission of the beam being monitored to about eighty percent.

While in this latter configuration, the photodetector 32, 34 current signal sum is unaffected and the photodetectors 32, 34 are not exclusively responsive to a single plane of polarization.

Approximately ninety percent polarization predominance remains in any one photodetector 32, 34, or, stated in another way, cross-talk between the photodetectors 32, 34 is about ten percent for linearly polarized light. The polarization axis contribution can still be calculated with this design configuration, but poses an inconvenience.

Beamsplitters 26, 28 are preferably an optical wedge made from material chosen from several readily available types of optical glass with reported values of refractive index, which, in turn, determines the Brewster angle, and thus the design of the optical wedge. As a non-limiting example, one such optical wedge may be made of BK-7 type glass with a wedge angle of approximately 0.75 degrees.

An optical wedge such as this avoids the Fabry-Perot interference obtained when windows with parallel surfaces are placed in a coherent light beam. Therefore, without this interference, the reflectance of the beam is uniform and not susceptable to variations due to beam size or movement as would otherwise be the case.

Although an optical wedge causes the beam to be deflected from the normal, two optical wedges aligned in the beam path can be rotationally positioned to redirect the beam back into the original beam path.

Reflectance of the beam depends on polarization orientation, and is given for:

$$P_{\parallel} = \left[ \frac{\sin(\theta - \theta')}{\sin(\theta + \theta')} \right]^2 ; P_{\perp} = \left[ \frac{\tan(\theta - \theta')}{\tan(\theta + \theta')} \right]^2$$

where $P_{\parallel}$ is reflectance for light polarized in the plane of incidence, $P_{\perp}$ is reflectance for light polarized transverse to the plane of incidence, $\theta$ is the incident angle, and $\theta$, is the refracted angle.

Snell's law describes these angles:

$$n(\sin \theta) = n' (\sin \theta')$$

where n and n' are the refractive index of the materials at the interface.

With the optical wedges oriented at the Brewster angle, each photodetector responds to a single plane of incidence. Polarization in the vertical plane, that is, reflected horizontally, would respond to a single plane of incidence. Polarization in the vertical plane Pv would be:

$$Pv = \frac{Dv}{Dv + Dh} \text{ and } Ph = 1 - Pv$$

where Dv and Dh are the photodetector currents from the vertical and horizontal photodetectors, respectively.

The photodetector means preferably chosen for the basic configuration of a preferred embodiment of the invention in a power monitor is a pair of silicon photodiodes selected as having nearly identical spectral responses. This means that spectral response of each of the silicon photodiodes to the vertical and horizontal polarization components of the incident beam, will be nearly identical regardless of beam wavelength from about 400 to about 900 nanometers.

There are preferably no intermediate windows positioned between the beamsplitters 24, 28, and the photodetectors 32, 34, to avoid the problem of the Fabry-Perot interference discussed above that would arise with windows having parallel surfaces.

Since a silicon photodiode is generally linear up to at least two milliwatts of power and receives only one-tenth of the incident beam power, linear response up to at least 20 milliwatts may be expected from the basic beam monitor configuration described here.

For higher beam powers, some form of attenuation for the photodetector flux would be necessary. One method would be to coat the beamsplitters 26, 28, with a partially anti-reflective coating. This method, however, introduces problems in assuring that the spectral reflectance is identical from one optical wedge to the other optical wedge, and, as well, can cause an increase in cost.

Another simpler method would be to use some means to attenuate the incident power directed to the photodetectors.

Commonly employed methods of attenuating the incident power directed to the photodetectors introduce diffusors that scatter the light (such as opal glass or plastic equivalents, integrating spheres, or devices designed to absorb or reflect a portion of the radiation, such as metal films, glass absorbers, metal screens, or similar means).

In the FIGs there are shown several opal or plastic diffusers 36, 38, which would raise the power limit to about two watts.

Figure 4:
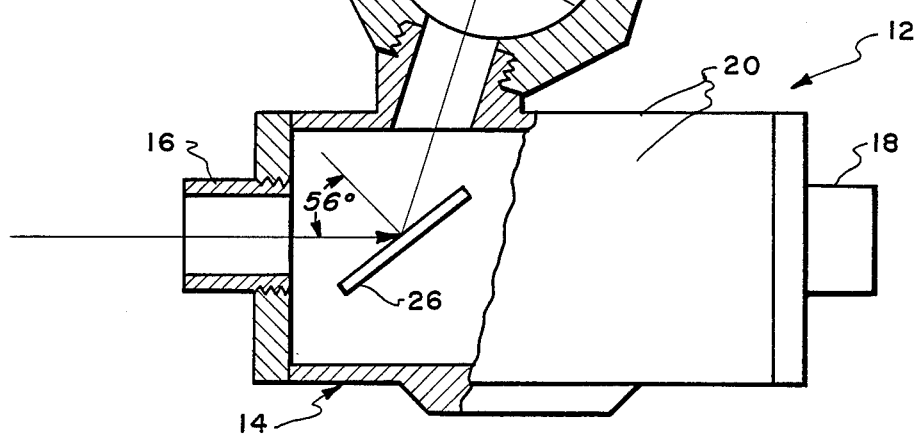
FIG. 4 is a view similar to that of FIG. 2 showing integrating spheres.

Finally, by replacing the straight line photodetectors 32, 34, with integrating spheres 40, 42, as shown in FIG. 4, maximum permissible beam power would reach to about 20 watts. If this latter configuration is used, special concern must be paid to insure that the integrating spheres 40, 42, are optically matched for equal spectral attenuation of the light beam.

The beam power monitor described herein has a number of useful applications described, with some examples, below.

For certain types of tests of optical properties of materials, it is essential to have highly stabilized beam power. This is usually accomplished by means of an electro-optical modulator which is a system in which the plane of polarization in a crystal can be influenced by applying an electrical voltage. Normally the detector element of the electro-optical modulator is located at the laser, and although the beam is stabilized at the exit port, the beam is subject to variations induced by optical components in the beam path. An improvement in beam stability is produced by placing a monitor embodying the present invention as close to the point of testing as is practical, thereby eliminating variations in the beam due to optical elements which may be sensitive to polarization, vibration or alignment.

A less expensive method of beam power stabilization is illustrated in a method used to select photodiodes based on their response to laser radiation. Although the laser power is unregulated, by recording test and monitor detector readings simultaneously, the test data can be corrected for any observed variations in beam power. In effect, a computer becomes a means to achieve the same results as if the beam power were invariant.

In a similar manner, a laser beam monitor embodying the present invention can become the sensor for a radiometer, and calibrated to indicate the exact power level in the transmitted beam. One can then observe the actual delivered beam power without having the beam obstructed. Comparison or calibration of other instruments can easily be performed.

The present invention can also be incorporated in a device useful as a polarization analyzer for indicating the degree of beam polarization in the vertical and horizontal axes and, perhaps more importantly, how this distribution is affected by optical components introduced into the beam path.

The invention described above is, of course, susceptible to many variations, modifications and changes, all of which are within the skill of the art. It should be understood that all such variations, modifications and changes are within the spirit and scope of the invention and of the appended claims. Similarly, it will be understood that it is intended to cover all changes, modifications and variations of the example of the invention herein disclosed for the purpose of illustration which do not constitute departures from the spirit and scope of the invention.

What is claimed is:

1. An apparatus for monitoring the light energy power level of a beam of light having an axis, comprising:
   beam directing means located along the axis of the light beam for directing first and second portions of the light beam into first and second paths, respectively orthogonal to each other and at an angle to the axis equal to or less than 90° while transmitting the remaining portion of the light beam therethrough;
   first and second photodetector means positioned to intercept said first and second light beam portions respectively, each having similar spectral responsively for detecting the light energy power level of the beam portion directed thereto, and each providing an output signal indicative of the energy power level of the impinging light beam portion; and
   analysis system means, coupled to said first and second photodetector means and responsive to the output signals therefrom for calculating the total light energy power level of the light beam.

2. An apparatus for monitoring the light energy power level of a beam of light as in claim 1, wherein said beam directing means include first and second optical wedge beamsplitters, tilted to direct said first and second portions of the light beam by reflection therefrom respectively, into said first and second paths which are orthogonal to the axis.

3. An apparatus for monitoring the light energy power level of a beam of light as in claim 1, wherein the tilt angles of said first and second optical wedge beamsplitters are each at the Brewster angle with respect to the light beam axis, so that the polarization direction of said first and second light beam portions are generally orthogonal to one another.

4. An apparatus for monitoring the light energy power level of a beam of light as in claim 2 or 3, further including attenuating means to reduce selectively the light energy power levels of said first and second light beam portions.

5. An apparatus for monitoring the light energy power level of a beam of light as in claim 4, wherein said attenuating means comprise at least one diffuser means located in each of said first and second light beam portions.

6. An apparatus for monitoring the light energy power level of a beam of light as in claim 5, wherein said diffuser means includes at least one opal diffuser lens.

7. An apparatus for monitoring the light energy power level of a beam of light as in claim 5, wherein said diffuser means includes at least one plastic diffuser lens.

8. An apparatus for monitoring the light energy power level of a beam of light as in claim 2 or 3, wherein said attenuating means include a partially anti-reflective coating on the reflecting surfaces of said first and second optical wedge beamsplitters.

9. An apparatus for monitoring the light energy power level of a beam of light as in claim 2 or 3, wherein said photodetector means includes at least one silicon photodiode.

10. An apparatus for monitoring the light energy power level of a beam of light as in claim 2 or 3, wherein said first and second photodetector means respectively include first and second integrating sphere member means, each respectively containing therein first and second photodetector elements, and further includes means for directing said first and second light beam portions into said first and second integrating sphere member means, respectively.

11. An apparatus for monitoring the light energy power level of a beam of coherent laser light having an axis, comprising:
   first and second optical wedge beamsplitters located on the axis of the light beam and tilted orthogonally to one another to reflect a portion of the laser beam into first and second partial light beams each directed orthogonally with respect to the axis and each other while transmitting the remaining portion of the laser light beam therethrough;
   first and second photodetector means having similar spectral responsivity, each respectively positioned in said first and second optical paths to receive reflected laser beam portions and each producing an output signal indicative of the detected light energy power level of the partial light beam impinging thereon; and
   analysis system means coupled to said first and second photodetector means and responsive to the output signals provided therefrom for calculating the total light energy power level of the laser beam.

12. An apparatus for monitoring the light energy power level of a beam of light as in claim 11, further including attenuating means to reduce selectively the light energy power levels of said first and second light beam portions.

13. An apparatus for monitoring the light energy power level of a beam of light as in claim 12, wherein said attenuating means include a partially anti-reflective coating on said first and second optical wedge beamsplitters.

14. An apparatus for monitoring the light energy power level of a beam of light as in claim 12, wherein said attenuation means comprise at least one diffuser means located in each of said first and second light beam portions.

15. An apparatus for monitoring the light energy power level of a beam of light as in claim 14, wherein said diffuser means includes at least one opal diffuser lens.

16. An apparatus for monitoring the light energy power level of a beam of light as in claim 14, wherein said diffuser means includes at least one plastic diffuser lens.

17. An apparatus for monitoring the light energy power level of a beam of light as in claim 12, wherein said photodetector means includes at least one silicon photodiode.

18. An apparatus for monitoring the light energy power level of a beam of light as in claim 12, wherein each of said photodetector means includes first and second integrating sphere member means, each respectively containing therein said first and second photodetector element, and means for directing said first and second light beam portions into said first and second integrating sphere member means, respectively.

* * * * *